(12) United States Patent
Samuel, Jr.

(10) Patent No.: US 10,239,448 B1
(45) Date of Patent: Mar. 26, 2019

(54) UNATTENDED OCCUPANT ALERT SYSTEM

(71) Applicant: Carl Samuel, Jr., Bronx, NY (US)

(72) Inventor: Carl Samuel, Jr., Bronx, NY (US)

( * ) Notice: Subject to any disclaimer, the term of this patent is extended or adjusted under 35 U.S.C. 154(b) by 0 days.

(21) Appl. No.: 15/820,435

(22) Filed: Nov. 22, 2017

(51) Int. Cl.
*G08B 21/02* (2006.01)
*B60Q 9/00* (2006.01)
*G08B 21/18* (2006.01)
*B60N 2/26* (2006.01)

(52) U.S. Cl.
CPC .......... *B60Q 9/00* (2013.01); *B60N 2/26* (2013.01); *G08B 21/0205* (2013.01); *G08B 21/182* (2013.01)

(58) Field of Classification Search
CPC .... B60N 2/002; G08B 21/02; G08B 21/0202; G08B 21/24
USPC ......... 340/573.4, 457, 425.5, 539.26, 539.27
See application file for complete search history.

(56) References Cited

U.S. PATENT DOCUMENTS

| | | | |
|---|---|---|---|
| 464,481 A | 12/1891 | Schmitt | |
| 6,922,147 B1 * | 7/2005 | Viksnins | B60N 2/002 180/272 |
| 7,170,401 B1 * | 1/2007 | Cole | B60N 2/002 340/439 |
| 7,469,705 B1 | 12/2008 | Nocella, III | |
| 8,659,414 B1 * | 2/2014 | Schuk | G08B 21/0202 307/10.1 |
| 2003/0222775 A1 * | 12/2003 | Rackham | B60R 25/1004 340/457 |
| 2006/0096625 A1 | 5/2006 | Chen et al. | |
| 2007/0041175 A1 | 2/2007 | Chang | |
| 2007/0096891 A1 * | 5/2007 | Sheriff | B60N 2/002 340/457.1 |
| 2010/0078978 A1 * | 4/2010 | Owens | B60N 2/002 297/250.1 |
| 2010/0253504 A1 * | 10/2010 | Lliteras | G08B 21/22 340/539.11 |
| 2013/0027912 A1 | 1/2013 | Liao | |
| 2013/0109342 A1 * | 5/2013 | Welch | B60N 2/002 455/404.2 |
| 2013/0148334 A1 | 6/2013 | Chen et al. | |
| 2013/0201013 A1 * | 8/2013 | Schoenberg | B60R 22/48 340/438 |
| 2014/0253314 A1 * | 9/2014 | Rambadt | B60N 2/002 340/457.1 |
| 2016/0078737 A1 * | 3/2016 | Cohen | G08B 21/0205 340/457 |

(Continued)

Primary Examiner — Phung Nguyen

(57) ABSTRACT

An unattended occupant alert system includes a car seat that may be positioned in a vehicle. A child is selectively seated in the car seat and the car seat has a pair of shoulder straps. An electronic device is included and the electronic device is carried by a caregiver. An alarm unit is coupled between the shoulder straps to selectively and removably attach the shoulder straps together. In this way the alarm unit retains the child in the car seat and the alarm unit is turned on when the shoulder straps are attached together. The alarm unit is in thermal communication with an interior of the vehicle to detect a temperature in the vehicle. Additionally, the alarm unit is in electrical communication with the electronic device. The electronic device emits an alert when the alarm unit is turned on and the alarm unit detects a temperature that exceeds a trigger temperature. In this way the alarm unit alerts the caregiver to a potential environmental danger for the child.

11 Claims, 5 Drawing Sheets

(56) References Cited

U.S. PATENT DOCUMENTS

| | | | |
|---|---|---|---|
| 2016/0121848 A1* | 5/2016 | Seibert | B60N 2/002 340/457 |
| 2016/0167479 A1* | 6/2016 | Morin | B60Q 1/50 701/48 |
| 2016/0272112 A1* | 9/2016 | DeGrazia | B60Q 9/00 |
| 2016/0326765 A1 | 11/2016 | Barbret | |

* cited by examiner

UNATTENDED OCCUPANT ALERT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to alert devices and more particularly pertains to a new alert device for communicating an alert when an occupant in a vehicle is exposed to a potentially dangerous temperature.

BRIEF SUMMARY OF THE INVENTION

An embodiment of the disclosure meets the needs presented above by generally comprising a car seat that may be positioned in a vehicle. A child is selectively seated in the car seat and the car seat has a pair of shoulder straps. An electronic device is included and the electronic device is carried by a caregiver. An alarm unit is coupled between the shoulder straps to selectively and removably attach the shoulder straps together. In this way the alarm unit retains the child in the car seat and the alarm unit is turned on when the shoulder straps are attached together. The alarm unit is in thermal communication with an interior of the vehicle to detect a temperature in the vehicle. Additionally, the alarm unit is in electrical communication with the electronic device. The electronic device emits an alert when the alarm unit is turned on and the alarm unit detects a temperature that exceeds a trigger temperature. In this way the alarm unit alerts the caregiver to a potential environmental danger for the child.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
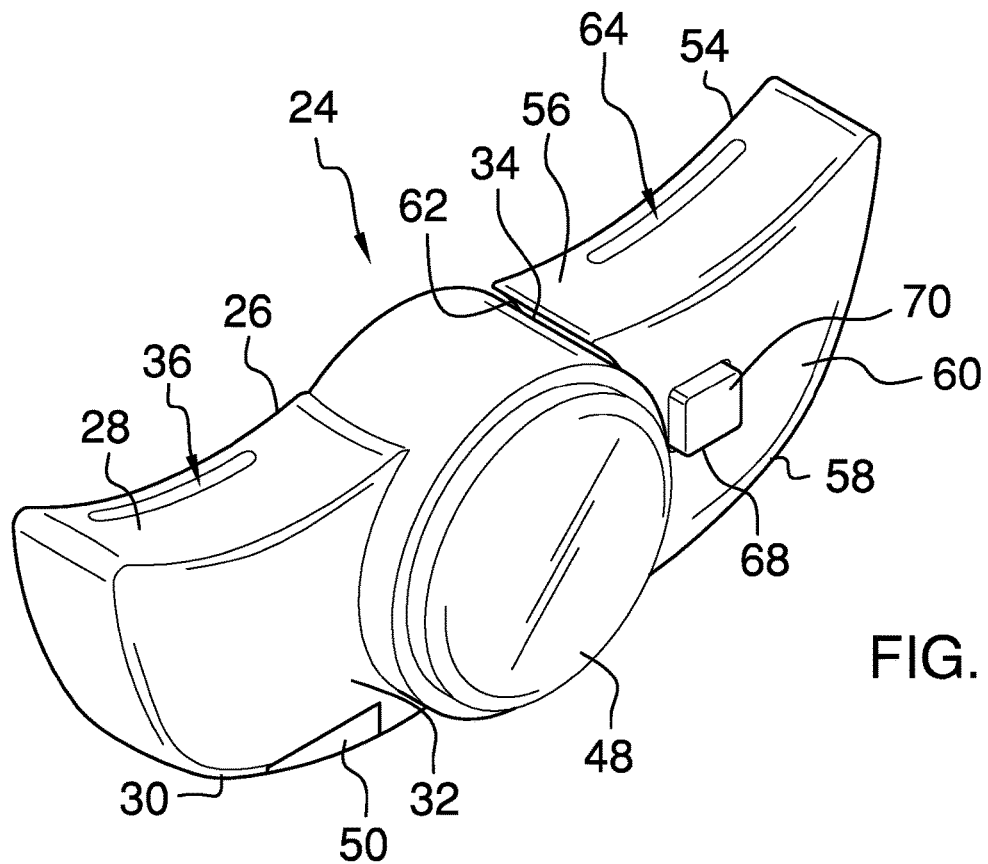
FIG. 1 is a top perspective view of an alarm unit of unattended occupant alert system according to an embodiment of the disclosure.
Figure 2:
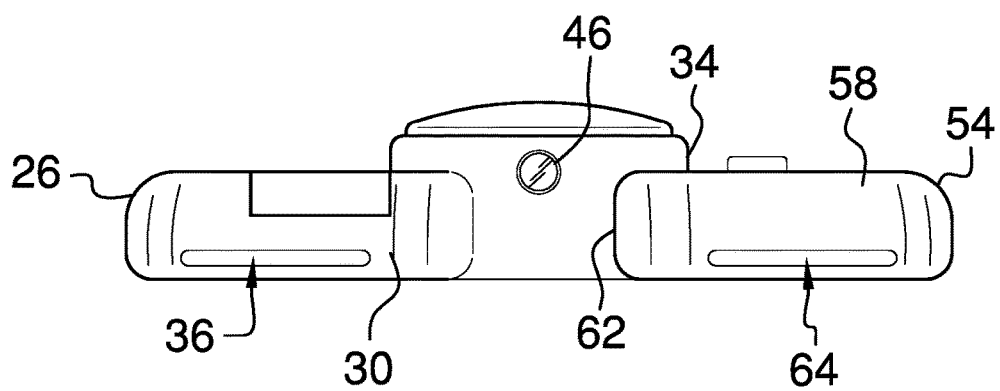
FIG. 2 is a bottom view of an alarm unit of an embodiment of the disclosure.
Figure 3:
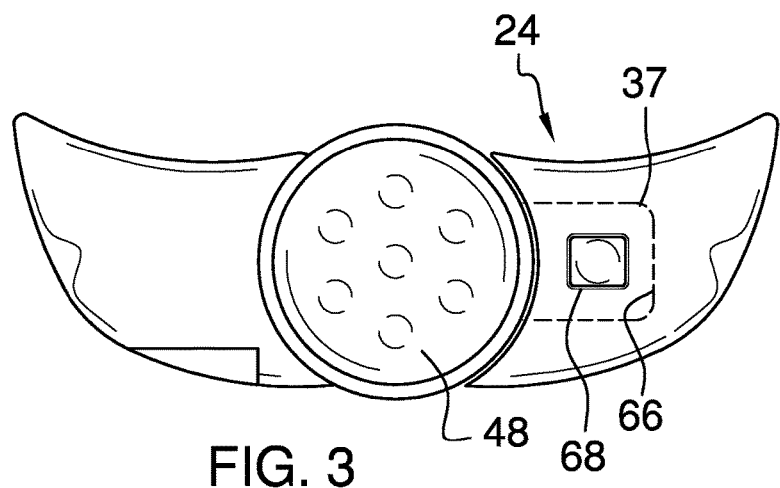
FIG. 3 is a front view of an alarm unit of an embodiment of the disclosure.
Figure 4:
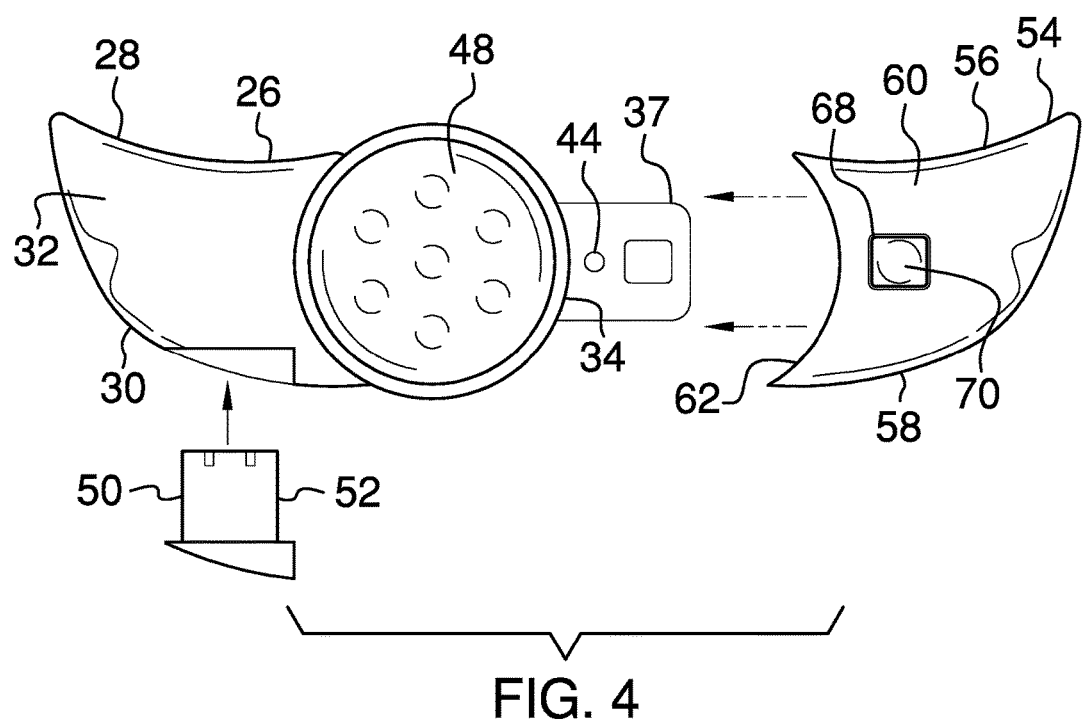
FIG. 4 is an exploded view of an alarm unit of an embodiment of the disclosure.
Figure 5:
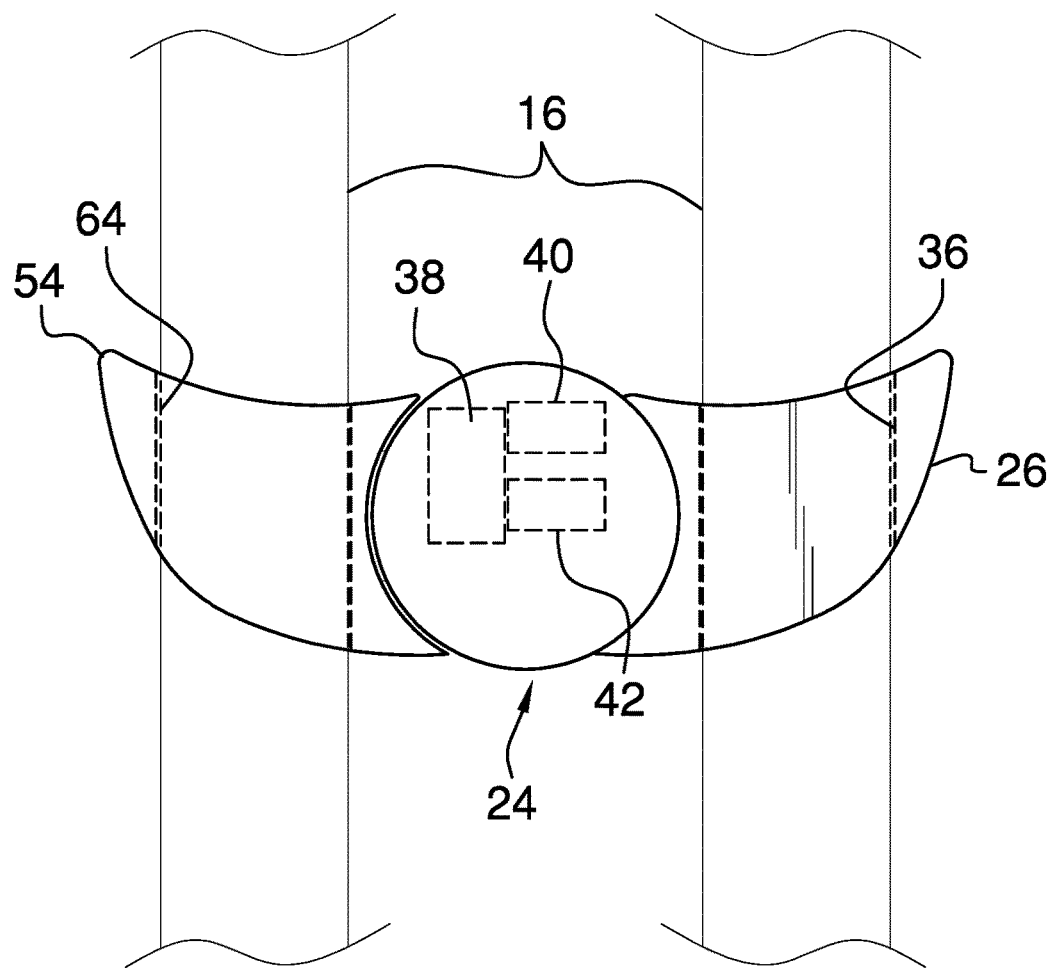
FIG. 5 is a back phantom view of an embodiment of the disclosure.
Figure 6:
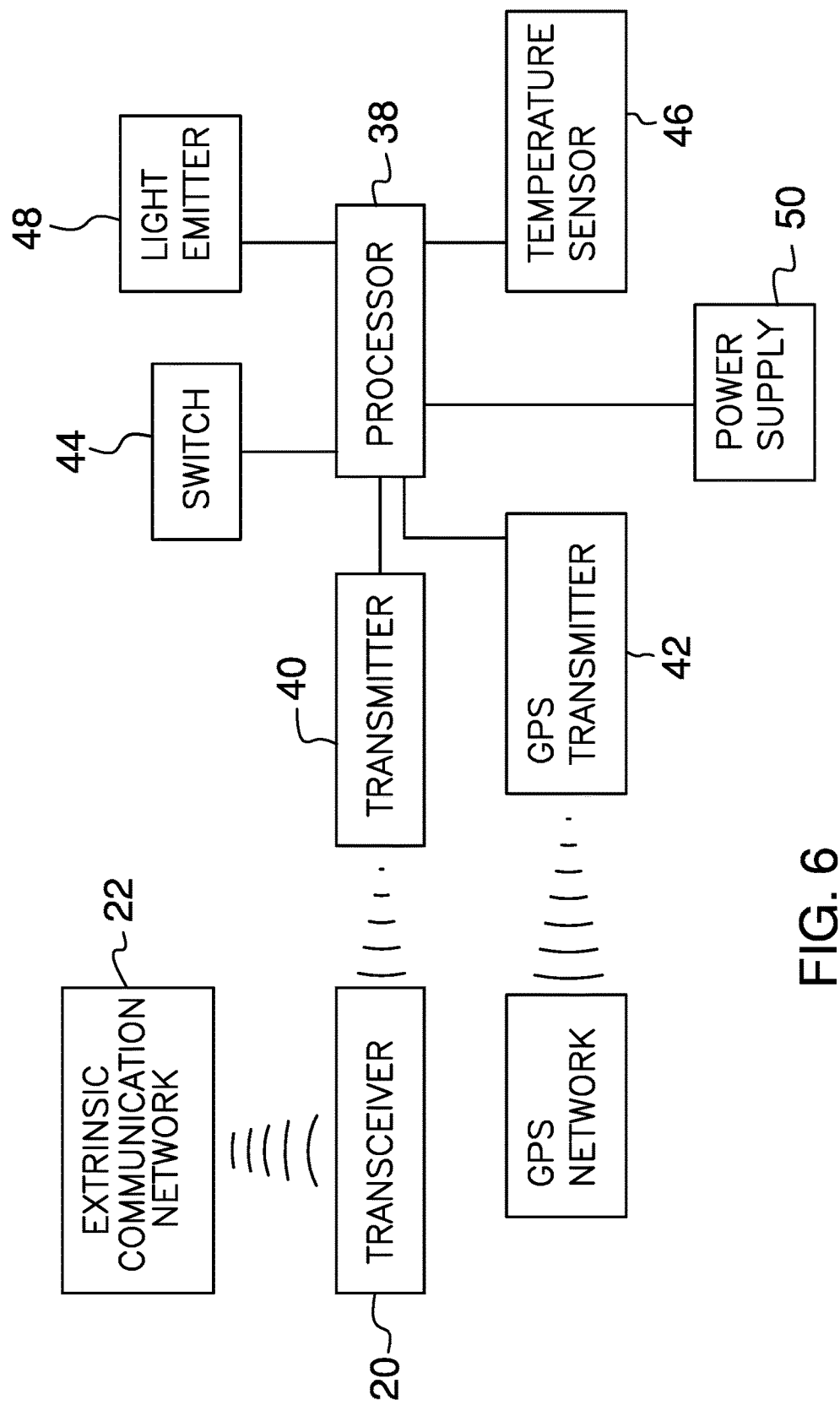
FIG. 6 is a schematic view of an embodiment of the disclosure.
Figure 7:
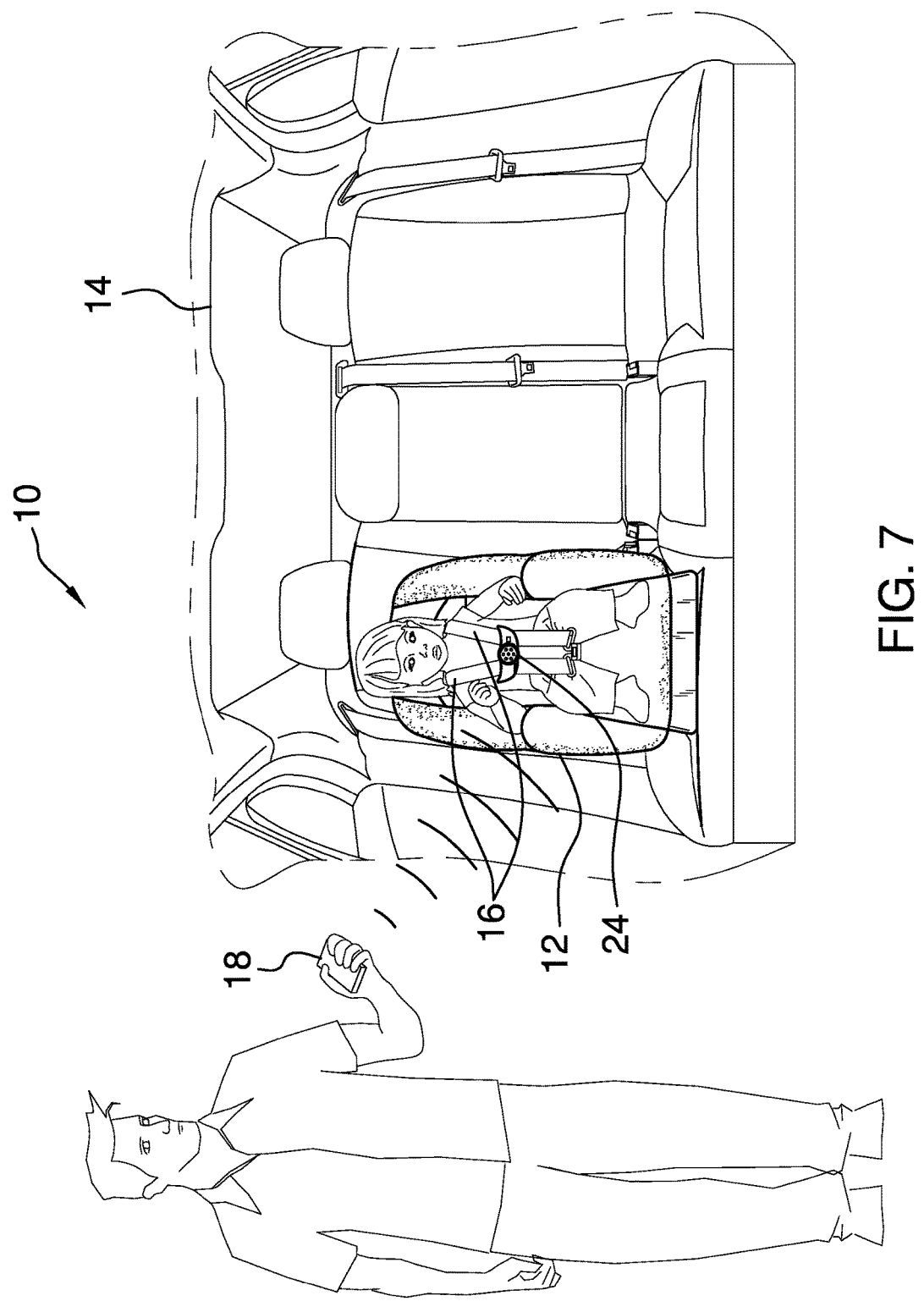
FIG. 7 is a perspective in-use view of an embodiment of the disclosure.

With reference now to the drawings, and in particular to FIGS. 1 through 7 thereof, a new alert device embodying the principles and concepts of an embodiment of the disclosure and generally designated by the reference numeral 10 will be described.

As best illustrated in FIGS. 1 through 7, the unattended occupant alert system 10 generally comprises a car seat 12 that is selectively positioned in a vehicle 14. The vehicle 14 may be a passenger vehicle 14 or the like and the car seat 12 may be a child safety seat or the like. A child is selectively seated in the car seat 12 and the car seat 12 has a pair of shoulder straps 16 for securing the child. An electronic device 18 is provided and the electronic device 18 is carried by a caregiver. The electronic device 18 has a transceiver 20 and the electronic device 18 may be a smart phone or the like. Additionally, the electronic device 18 may be in electrical communication with an extrinsic communication network 22, such as the Internet, a cellular phone network and any other electronic means of communication.

An alarm unit 24 is coupled between the shoulder straps 16 thereby facilitating the alarm unit 24 to selectively and removably attach the shoulder straps 16 together. In this way the alarm unit 24 helps to retain the child in the car seat 12. The alarm unit 24 is turned on when the shoulder straps 16 are attached together. Additionally, the alarm unit 24 is in thermal communication with an interior of the vehicle 14 and the alarm unit 24 detects a temperature in the vehicle 14. The alarm unit 24 is in electrical communication with the electronic device 18 and the electronic device 18 emits an alert when the alarm unit 24 is turned on and the alarm unit 24 detects a temperature that exceeds a trigger temperature.

In this way the alarm unit 24 alerts the caregiver to a potential environmental danger for the child.

The alarm unit 24 comprises a first housing 26 having a top side 28, a bottom side 30, a front side 32 and a first lateral side 34. The first housing 26 has a first slot 36 extending through the top side 28 and the bottom side 30 for insertably receiving an associated one of the shoulder straps 16. In this way the first housing 26 is slidably coupled to the associated shoulder strap 16. The first housing 26 may be laterally elongated and tapered at one end to define a wing shape. A buckle 37 is coupled to and extends away from the first lateral side 34 of the first housing 26.

A processor 38 is positioned within the first housing 26 and the processor 38 selectively generates an alert sequence. A transmitter 40 is positioned in the first housing 26 and the transmitter 40 is electrically coupled to the processor 38. The transmitter 40 is in electrical communication with the transceiver 20 in the electronic device 18. The transmitter 40 may be a radio frequency transmitter 40 or the like. The transmitter 40 may employ a WPAN signal and Bluetooth communication protocols. The transceiver 20 in the electronic device 18 may be synchronized with the transmitter 40 through any conventional means. The processor 38 may be an electronic processor 38 or the like.

A GPS transmitter 42 is positioned in the first housing 26 in the GPS transmitter 42 is electrically coupled to the processor 38. The GPS transmitter 42 is in electrical communication with a GPS network thereby facilitating the GPS network to establish a physical location of the first housing 26. A switch 44 is coupled to the buckle 37 and the switch 44 is electrically coupled to the processor 38. The switch 44 turns the processor 38 on when the switch 44 is engaged. The switch 44 may be an electronic microswitch 44 or the like.

A temperature sensor 46 is coupled to the first housing 26 and the temperature sensor 46 is in thermal communication with ambient air. The temperature sensor 46 is electrically coupled to the processor 38 and the temperature sensor 46 may be an electronic temperature sensor 46 or the like. The processor 38 generates the alert sequence when the temperature sensor 46 senses a temperature that is below a minimum trigger temperature. The minimum trigger temperature may be approximately 50.0 degrees Fahrenheit. The processor 38 generates the alert sequence when the temperature sensor 46 senses a temperature that is above a maximum trigger temperature. The maximum trigger temperature may be approximately 80.0 degrees Fahrenheit.

A light emitter 48 is coupled to the front side 32 of the first housing 26 to emit light outwardly therefrom. The light emitter 48 is electrically coupled to the processor 38 and the light emitter 48 is turned on when the switch 44 turns the processor 38 on. In this way the light emitter 48 visually communicates that the processor 38 is turned on. The light emitter 48 may comprise an LED or the like and the light emitter 48 may emit red colored light. A power supply 50 is positioned within the first housing 26 and the power supply 50 is electrically coupled to the processor 38. The power supply 50 comprises at least one rechargeable battery 52. Additionally, the power supply 50 may slide into a recess in the first housing 26 in the convention of a rechargeable battery 52.

A second housing 54 is provided that has a top side 56, a bottom side 58, a front side 60 and a second lateral side 62. The second housing 54 may be laterally elongated and tapered at one end such that the second housing 54 has a wing shape. The second housing 54 has a second slot 64 extending through the top side 28 and the bottom side 30 of the second housing 54. The second slot 64 insertably receives an associated one of the shoulder straps 16 such that the second housing 54 is slidably positioned on the associated shoulder strap. The second lateral side 62 of the second housing 54 has a third slot 66 extending therein and the third slot 66 insertably receives the buckle 37. Moreover, the switch 44 is engaged when the buckle 37 is inserted into the third slot 66.

A lock 68 is movably coupled to the second housing 54 and the lock 68 is selectively manipulated. The lock 68 releasably engages the buckle 37 when the buckle 37 is inserted into the third slot 66. In this way the first housing 26 is releasably attached to the second housing 54. The lock 68 including a button 70 that extends outwardly through the front side 32 of the second housing 54. The lock 68 disengages the buckle 37 when the button 70 is depressed thereby facilitating the first housing 26 to be removed from the second housing 54.

In use, the buckle 37 is inserted into the second housing 54 to secure the child in the car seat 12. The switch 44 is engaged, the processor 38 is turned on and the light emitter 48 is turned on. The electronic device 18 is synchronized with the transmitter 40. The electronic device 18 generates an alert, perhaps via an application that is stored on the electronic device 18, when the processor 38 generates the alert sequence. In this way the caregiver is notified that the temperature in the vehicle 14 is too low or too high and the child is in potential danger. Additionally, the electronic device 18 contacts emergency responders via the extrinsic communication network 22 in the event that the caregiver is unable to respond. The GPS transmitter 42 enables the emergency responders to locate the child in the vehicle 14.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An unattended occupant alert system comprising:
    a car seat being configured to be positioned in a vehicle, said car seat being configured to have a child seated therein, said car seat having a pair of shoulder straps;
    an electronic device being configured to be carried by a caregiver, said electronic device having a transceiver; and
    an alarm unit being coupled between said shoulder straps thereby facilitating said alarm unit to selectively and removably attach said shoulder straps together wherein said alarm unit is configured to retain the child in said car seat, said alarm unit being activated to a ready state when said shoulder straps are attached together, said alarm unit being in thermal communication with an interior of the vehicle wherein said alarm unit is configured to detect a temperature in the vehicle, said alarm unit being in wireless communication with said electronic device, said electronic device emitting an alert when said alarm unit is activated to said ready state and said alarm unit detects the temperature that exceeds a trigger temperature wherein said alarm unit is configured to alert the caregiver to a potential environmental danger for the child, said alarm unit comprising a first housing having a top side, a bottom side, a front side and a first lateral side, said first housing having a first slot extending through said top side and said bottom side, said first slot insertably receiving an associated one of said shoulder straps such that said first housing is slidably coupled to said associated shoulder strap.

2. The system according to claim 1, further comprising a buckle being coupled to and extending away from said first lateral side of said first housing.

3. The system according to claim 2, further comprising a processor being positioned within said first housing, said processor selectively generating an alert.

4. The system according to claim 3, further comprising a switch being coupled to said buckle, said switch being electrically coupled to said processor, said switch turning said processor on when said switch is engaged.

5. The system according to claim 3, further comprising a temperature sensor being coupled to said first housing wherein said temperature sensor is configured to be in thermal communication with ambient air, said temperature sensor being electrically coupled to said processor, said processor generating said alert when said temperature sensor senses the temperature that is below a minimum trigger temperature, said processor generating said alert when said temperature sensor senses the temperature that is above a maximum trigger temperature.

6. The system according to claim 3, further comprising a light emitter being coupled to said front side of said first housing wherein said light emitter is configured to emit light outwardly therefrom, said light emitter being electrically coupled to said processor, said light emitter being turned on when said switch turns said processor on.

7. The system according to claim 3, further comprising a power supply being positioned within said first housing, said power supply being electrically coupled to said processor, said power supply comprising at least one battery.

8. An unattended occupant alert system comprising:
a car seat being configured to be positioned in a vehicle, said car seat being configured to have a child seated therein, said car seat having a pair of shoulder straps;
an electronic device being configured to be carried by a caregiver, said electronic device having a transceiver; and
an alarm unit being coupled between said shoulder straps thereby facilitating said alarm unit to selectively and removably attach said shoulder straps together wherein said alarm unit is configured to retain the child in said car seat, said alarm unit being activated to a ready state when said shoulder straps are attached together, said alarm unit being in thermal communication with an interior of the vehicle wherein said alarm unit is configured to detect a temperature in the vehicle, said alarm unit being in wireless communication with said electronic device, said electronic device emitting an alert when said alarm unit is activated to said ready state and said alarm unit detects the temperature that exceeds a trigger temperature wherein said alarm unit is configured to alert the caregiver to a potential environmental danger for the child, said alarm unit comprising a second housing having a top side, a bottom side, a front side and a first lateral side, said second housing having a second slot extending through said top side and said bottom side of said second housing, said second slot insertably receiving an associated one of said shoulder straps such that said second housing is slidably positioned on said associated shoulder strap.

9. The system according to claim 8, wherein:
said alarm unit includes a first housing, a buckle being coupled to said first housing and a switch being coupled to said buckle; and
a second lateral side of said second housing has a third slot extending therein, said third slot insertably receiving said buckle, said switch being engaged when said buckle is inserted into said third slot.

10. The system according to claim 9, further comprising a lock being movably coupled to said second housing wherein said lock is configured to be manipulated, said lock releasably engaging said buckle when said buckle is inserted into said third slot such that said first housing is releasably attached to said second housing, said lock including a button extending outwardly through said front side of said second housing, said lock disengaging said buckle when said button is depressed thereby facilitating said first housing to be removed from said second housing.

11. An unattended occupant alert system comprising:
a car seat being configured to be positioned in a vehicle, said car seat being configured to have a child seated therein, said car seat having a pair of shoulder straps;
an electronic device being configured to be carried by a caregiver, said electronic device having a transceiver; and
an alarm unit being coupled between said shoulder straps thereby facilitating said alarm unit to selectively and removably attach said shoulder straps together wherein said alarm unit is configured to retain the child in said car seat, said alarm unit being activated to a ready state when said shoulder straps are attached together, said alarm unit being in thermal communication with an interior of the vehicle wherein said alarm unit is configured to detect a temperature in the vehicle, said alarm unit being in wireless communication with said electronic device, said electronic device emitting an alert when said alarm unit is activated to said ready state and said alarm unit detects the temperature that exceeds a trigger temperature wherein said alarm unit is configured to alert the caregiver to a potential environmental danger for the child, said alarm unit comprising:
a first housing having a top side, a bottom side, a front side and a first lateral side, said first housing having a first slot extending through said top side and said bottom side, said first slot insertably receiving an associated one of said shoulder straps such that said first housing is slidably coupled to said associated shoulder strap,
a buckle being coupled to and extending away from said first lateral side of said first housing,
a processor being positioned within said first housing, said processor selectively generating an alert,
a switch being coupled to said buckle, said switch being electrically coupled to said processor, said switch turning said processor on when said switch is engaged, a temperature sensor being coupled to said first housing wherein said temperature sensor is configured to be in thermal communication with ambient air, said temperature sensor being electrically coupled to said processor, said processor generating said alert when said temperature sensor senses the temperature that is below a minimum trigger temperature, said processor generating said alert when said temperature sensor senses the temperature that is above a maximum trigger temperature, a light emitter being coupled to said front side of said first housing wherein said light emitter is configured to emit light outwardly therefrom, said light emitter being electrically coupled to said processor, said light emitter being turned on when said switch turns said processor on, and a power supply being positioned within said first housing, said power supply being electrically coupled to said processor, said power supply comprising at least one battery, a second housing having a top side, a bottom side, a front side and a first lateral side, said second housing having a second slot extending through said top side and said bottom side of said second housing, said second slot insertably receiving an associated one of said shoulder straps such that said second housing is slidably positioned on said associated shoulder strap, a second lateral side of said second housing having a third slot extending therein, said third slot insertably receiving said buckle, said switch being engaged when said buckle is inserted into said third slot, and a lock being movably coupled to said second housing wherein said lock is configured to be manipulated, said lock releasably engaging said buckle when said buckle is inserted into said third slot such that said first housing is releasably attached to said second housing, said lock including a button extending outwardly through said front side of said second housing, said lock disengaging said buckle when said button is depressed thereby facilitating said first housing to be removed from said second housing.

\* \* \* \* \*